Oct. 25, 1960 C. THUMIM 2,957,563
ELECTRIC HYDRAULIC CLUTCH AND BRAKE FOR PAPER CUTTERS
Filed June 2, 1959 2 Sheets-Sheet 1

INVENTOR.
CARL THUMIM
BY *Ostrolenk, Faber,*
*Gerb & Soffen*
ATTORNEYS

Oct. 25, 1960 C. THUMIM 2,957,563
ELECTRIC HYDRAULIC CLUTCH AND BRAKE FOR PAPER CUTTERS
Filed June 2, 1959 2 Sheets-Sheet 2

INVENTOR.
CARL THUMIM

2,957,563

ELECTRIC HYDRAULIC CLUTCH AND BRAKE FOR PAPER CUTTERS

Carl Thumim, Westbury, N.Y., assignor to The Lawson Company Division of Miehle-Goss-Dexter, Incorporated, New York, N.Y., a corporation of New York Filed June 2, 1959, Ser. No. 817,611

2 Claims. (Cl. 192—18)

This invention relates to brake-clutch control for guillotine type paper cutters and more particularly to control incorporating automatic safety features.

It is an object of the invention to provide a mechanism comprising hydraulically powered clutch and brake elements wherein, upon failure of hydraulic power, the brake is automatically set and the clutch automatically disengaged.

It is another object of the invention to provide a mechanism wherein overload on the knife driving shaft will effect slipping of the clutch mechanism so as to prevent damage.

It is an additional object of the invention to provide a rugged and compact mechanism involving a minimum number of parts and components operative to achieve braking and clutch control.

Other objects and features of the invention will be apparent from the description which follows.

Briefly, my invention comprises the combination of a hydraulic cylinder or other power means operative through a lever system to effect engagement of a clutch through which torque is transmitted from a flywheel mounted on a power shaft to the shaft. The arrangement is such that upon actuation by hydraulic power for clutch engagement, a brake is released by pressure of a brake disengaging spring. However, upon such power actuation a relatively heavy spring is compressed so that in the event of failure of power, the compressed spring, acting through a large mechanical advantage, immediately applies the brake, overpowering the brake-disengaging spring. At this time, the clutch is likewise automatically disengaged by means of tension springs acting on a lever engaging clutch.

Incorporated in the invention is a slip clutch through which the main clutch operates so that in the event of overload on the knife, there is loss of torque acting on the shaft to prevent damage.

Figure 1:
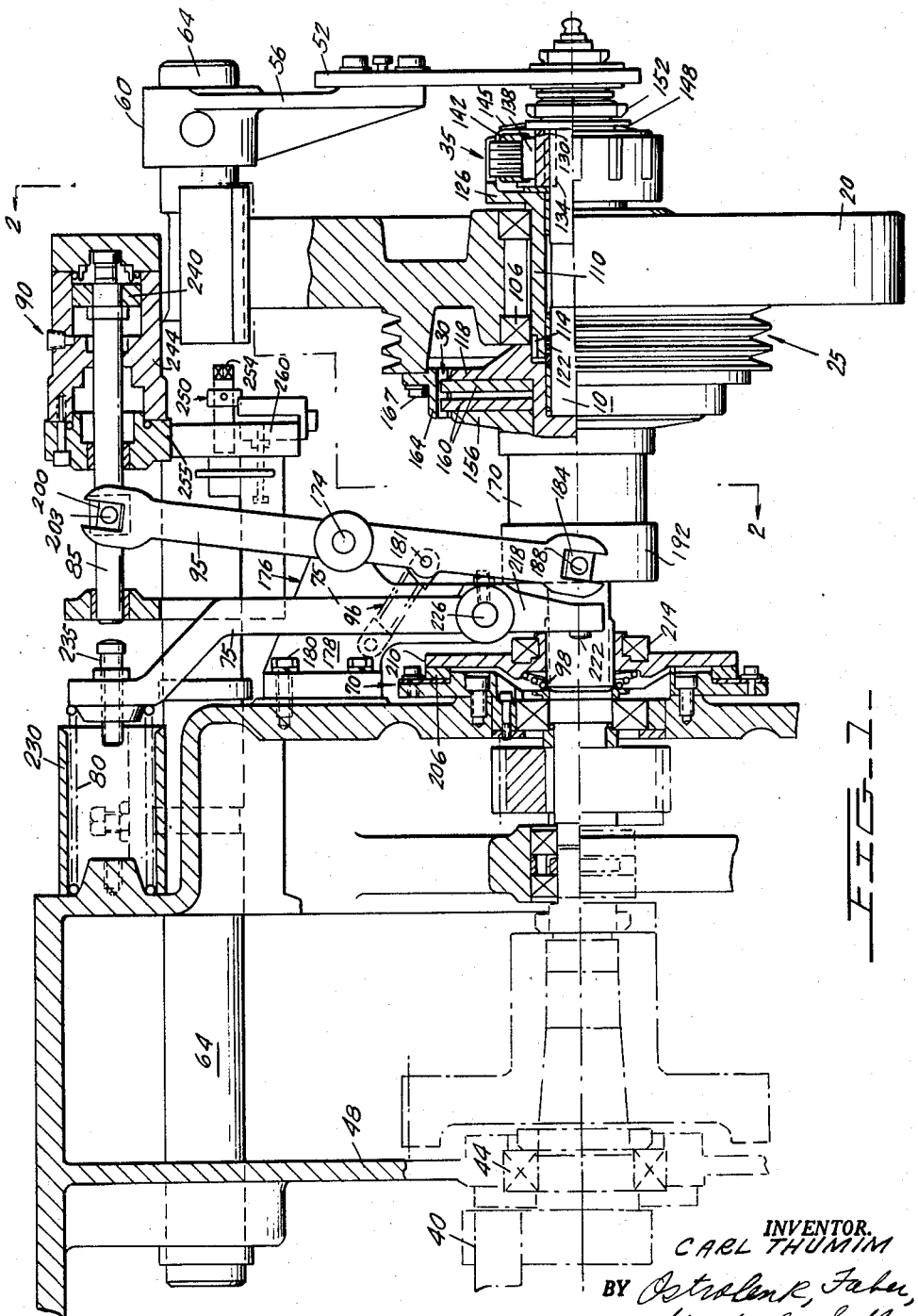
Figure 2:
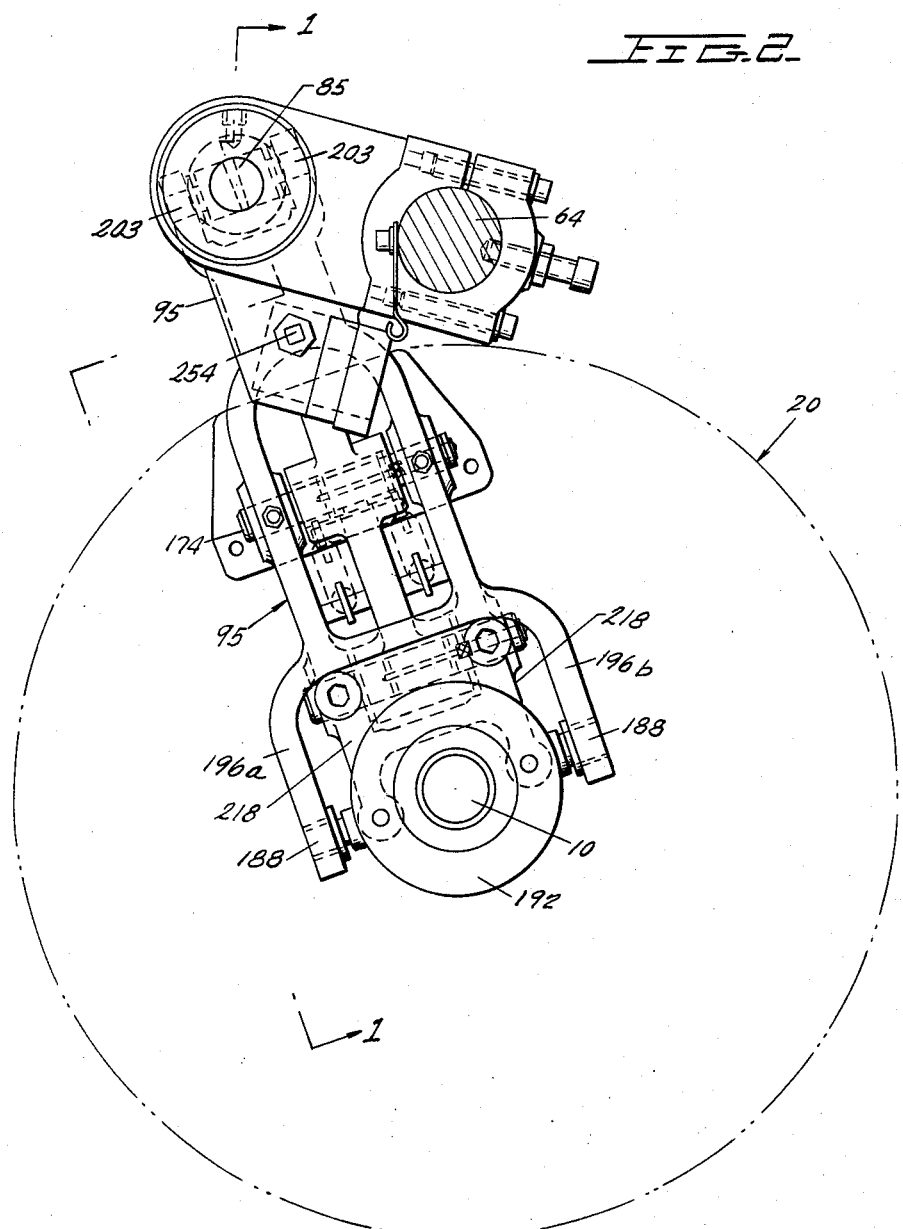

A detailed description of my invention will now be given in conjunction with the appended drawings in which:

Figure 1 is a cross-section in elevation of the mechanism through 1—1 of Figure 2, showing the essential features of the combination, and Figure 2 is a cross-sectional view through 2—2 of Figure 1.

Referring now to the drawing, the invention comprises a knife bar (not shown) actuating power shaft 10 on which is mounted a flywheel 20 integral with a pulley wheel 25 which will be understood to be connected to an electric motor for rotating the flywheel. The flywheel may be coupled to the shaft via friction clutch 30 which is coupled in series with a slip type of friction clutch 35. Shaft 10 will be understood to drive a guillotine knife bar as by the crank arm 40, and it will be noted that the shaft is supported in a suitable bearing 44 carried in the machine frame 48, at one end of the shaft, and is supported at its other end by hanger elements such as 52 and 56 which are bolted together as shown and which depend from a collar 60 integral with hanger element 56 and bolted as shown, to an end of a cantilever shaft 64, which cantilever shaft is supported on the machine frame at its other end. A brake 70 is provided for the shaft 10 effective to stop rotation of the shaft when braking pressure is applied through a bifurcated lever 75. The lever 75 is actuated for braking purposes by a relatively heavy spring 80, which spring is compressed by means of a force exerting element such as the piston extension rod 85 actuated by a power means such as a hydraulic piston and cylinder arrangement 90. Actuation of rod 85 also serves to rock a bifurcated lever 95 against bias of a tension spring arrangement 96, which rocking effects engagement of the clutch 30 while at the same time compressing the spring 80 and removing brake pressure force of the spring otherwise acting through lever 75 on brake 70. Thus the brake automatically disengages by virtue of a relatively light disengaging spring 98.

Accordingly, failure of pressure in the hydraulic cylinder, lever 95 is rocked in the reverse direction by tension spring arrangement 96 to disengage the clutch while at the same time expansion of spring 80, automatically acting through a large mechanical advantage effected by lever 75, applies the brake 70 to stop rotation of shaft 10. Likewise, deliberate pressure control at either end of the cylinder will, of course, move rod 85 in either direction to maintain or stop rotation of shaft 10, thus controlling and powering a cutting stroke.

The above description serves to cover the fundamental components and their co-action with each other for achieving the general purposes of the invention. Structural and mechanical details will now be described.

Thus, the fly wheel 20 is rotative on a bearing 106 which is mounted on a sleeve 110, which sleeve 110 is keyed at 114 to a clamping disc 118 which forms part of clutch 30. Sleeve 110 is rotatively carried on shaft 10 via ball bearings 122 and the right-hand end of the sleeve will be seen to form the housing 126 of the safety slip clutch 35.

The safety slip clutch has an inner bushing 130 keyed at 134 to shaft 10 and carries a plurality of conventional inner discs as noted which are slidably splined as by the spline 138 to bushing 130 for co-action with a plurality of alternate discs of conventional construction. It is also slidably splined as shown to clutch housing 126. The disc arrangement is clamped as by clamping discs 142 and maintained in predetermined compression, to effect a predetermined torque before slippage, by a disc spring 145 retained on bushing 130 as by a washer 148 and the retaining nut 152 threaded to the hub.

The primary clutch 30 has the aforementioned clamping disc 118 and the reciprocal clamping disc 156 mounted on the hub portion of disc 118 as shown, and such clamping discs compress friction discs 160 therebetween, the discs 160 being splined to a collar 164 bolted to pulley 25 as by bolts such as 167. The friction discs are shown as being separated, that is, in non-engaging condition. However it will be understood that upon inward movement of clamping disc 156 drive will be effected from the flywheel via the pulley, the collar 164, the friction discs and clamp disc 118, sleeve 110, clutch housing 126, the clutch discs of clutch 35, and bushing 130 to shaft 10.

Reciprocation of clamping disc 156, in which shaft 10 rotates, is effected by the lever 95 which has a lower end in engagement with a collar 170 integral with clamp disc 156. The lever is pivoted on a pin 174 which will be understood to be carried by a bracket 176 having flanges 178 (one shown), bolted to the machine frame as by bolts such as 180. The lever 95 is biased in a clockwise direction by a double tension spring arrangement 96 which will be seen to consist of a pair of parallel tension springs having end links 181 pivoted respectively on the flanges of bracket 176 and that portion of the lever 95 below pin 174.

The lower end of the lever 95 is slotted as shown to carry a slide block 184 and a trunnion 188 is carried in the block and passes into a collar 192, which collar is integral with the hub 170 of the clamping disc 156. As noted on Figure 2, the lever 95 is bifurcated at its lower end having legs 196a and b straddling the collar 192, there being a trunnion 188 passing from each leg into the collar. Thus, it will be apparent that lever 95 may rock to and fro on pivot pin 174 and reciprocate collar 192 via the slide blocks and the trunnions. The upper end of the lever 95 is provided with an identical construction, being bifurcated, each leg carrying a slide block and trunnion 200 and 203, which trunnions are suitably secured to the rod 85. It will be understood from the construction that reciprocation of the rod 85 effects oscillation of the lever 95 and clutching or de-clutching of clutch 30. Thus, forced movement of rod 85 as by pressure on either side of the piston will control clutching and de-clutching. On the other hand, should pressure be lost in the cylinder, compression spring arrangement 80 will swing lever 95 clockwise, thus disengaging clutch 30, the full stroke being completed by 96.

The brake 70 consists of the fixed plate 206 and the rotary plate 210 which is keyed to shaft 10. The light spring 98 normally forces plate 210 away from plate 206 to disengage the brake. The rotary plate has a thrust bearing 214 fastened to it, which thrust bearing can be engaged by the legs 218 of the bifurcated lever 75. Each leg carries a striking button 222 for engaging the bearing 214. Lever 75 is pivoted as on a pin 226 carried between the flanges 178 of the bracket 176. It will be noted that the distance from pin 226 to the striking buttons is considerably less than the distance from the pin to the upper end of the lever where it engages the relatively heavy compression spring 80 which is housed within a sleeve 230. The upper end of the lever carries a threadedly adjustable bolt or abutment 235 engageable by the end of rod 85 as the rod moves towards the left under hydraulic power. Thus, such movement of the rod effects counterclockwise rotation of lever 75 while compressing spring 80. This movement of lever 75 backs the striking buttons 222 away from the thrust bearing 214 and permits the relatively weak spring 98 to push the movable brake plate 210 away from the stationary plate, thereby releasing braking effect on shaft 10. Accordingly, as long as force is exerted by rod 85, spring 80 remains compressed, brake 70 is disengaged, and clutch 30 is engaged. If, however, force should cease to be exerted by rod 85 then, automatically, spring 80 expands and is operative through the large mechanical advantage of lever 75 to effect brake engagement; simultaneously, as hereinabove explained, clutch 30 is disengaged by virtue of 80 plus the tension springs pulling on the lower portion of lever 95.

From the foregoing, it will, of course, be understood that spring 80 is considerably more powerful than spring 98, so that spring 80 can effect braking force against the bias of spring 98.

Referring now to the cylinder and piston arrangement 90, it will be noted that the rod 85 is actually an extension of the piston 240 which reciprocates in the cylinder 244. Accordingly, pressure at the right-hand side of the piston will force rod 85 to the left, while pressure at the left-hand side of the piston will produce a reverse motion of the rod. The piston and cylinder arrangement is conventional and will be understood to be controlled by conventional means, such as solenoid-operated valve actuated in response to under control of a push button controlled circuit, all of which arrangement has heretofore been known and is well within the skill of workers in the art to devise. However, it should be noted that the "fail safe" mechanism as herein disclosed is not necessarily dependent upon hydraulic pressure for operation of the rod 85, but could utilize a solenoid power means, of conventional nature. Accordingly, the representation of the piston-cylinder combination 90 is merely for the purpose of illustrating one form of power means for effecting a reciprocating force. Under the circumstances, there is no need to show any detailed arrangement of a liquid pressure source, valve controls, etc. inasmuch as such arrangement does not form part of the present invention and a conventional arrangement can be used.

In order to provide for manual operation of lever 95 for testing and adjustment purposes, a jack screw device 250 is provided which may be carried in a depending bracket 255 or in any other suitable manner, which jack screw device has a threaded screw 254 that may be manually turned to abut lever 95 as will be understood from Figure 1. A switch 260 is provided which is normally closed, or normally open, depending on circuitry desired, but which is actuated upon initial manual movement of the jack screw to effect cut off of power. Power cut off may take effect at an electric motor which operates the pump for the hydraulic system, or at any point, such as the motor which operates shaft 10, the circuitry being of a conventional nature and well within the skill of persons working in the art.

The purpose and operation of slip clutch 35 will be readily apparent from the above description; in the event of over-load on the knife bar, the predetermined torque provided for in the slip clutch by the pressure of disc spring 145 will be exceeded. Accordingly, the clutch will slip. Such increased load as is occasioned by effecting a slipping of the clutch will, of course, cause increased current in the motor which serves to rotate shaft 10, and such motor will cut out due to the built-in over-load switch feature.

The adjustable abutment element 235 is normally set with a gap relative the end of the rod 85 for the thickness of the brake lining of brake 70, when such lining is new. The gap is, of course, adjusted to compensate for wear up to the point where new lining is required.

Having thus described my invention, I am aware that various changes may be made without department from the spirit thereof, and, accordingly, I do not seek to be limited to the precise illustration herein given except as set forth in the appended claims.

I claim:

1. A brake and clutch control device for a paper cutting machine which comprises a power shaft, clutch means for transmitting torque to said power shaft, brake means for effecting braking of said power shaft, a power means having a movable force exerting element, clutch actuating means operable by force exerted by said force-exerting element to effect and maintain clutch engagement, a brake-engaging spring compressible by force exerted by said force-exerting element, brake actuating means connecting said spring with said brake for effecting brake engagement when said spring expands responsive to release of said force, and means for reversely motivating said clutch actuating means to disengage said clutch upon release of force applied to said clutch-actuating means, said brake means comprising a spring for effecting brake disengagement, said brake engaging spring being substantially stronger than said brake disengaging spring, said brake actuating means comprising a pivoted lever having one end disposed to compress said brake engaging spring and another end disposed for engagement with said brake means, said force exerting element comprising a reciprocal rod operable to drive that end of said brake actuating lever which compresses said brake engaging spring, the pivotal point of said brake engaging lever being substantiallly closer to said brake means than to said brake engaging spring means for effecting a large mechanical advantage.

2. A brake and clutch control device for a paper cutting machine which comprises a power shaft, clutch means for transmitting torque to said power shaft, brake means for effecting braking of said power shaft, a power means having a movable force-exerting element, clutch actuating means operable by force exerted by said force-exerting element to effect and maintain clutch engagement, a brake engaging spring compressible by force exerted by said force-exerting element, brake actuating means connecting said spring with said brake for effecting brake engagement when said spring expands responsive to release of said force, and means for reversely motivating said clutch actuating means to disengage said clutch upon release of force applied to said clutch-actuating means, said brake means comprising a spring for effecting brake disengagement, said brake engaging spring being substantially stronger than said brake disengaging spring, said brake actuating means comprising a pivoted lever having one end disposed to compress said brake engaging spring and another end disposed for engagement with said brake means, said force exerting element comprising a reciprocal rod operable to drive that end of said brake actuating lever which compresses with said brake engaging spring, the pivotal point of said brake engaging lever being substantially closer to said brake means than to said brake engaging spring means for effecting a large mechanical advantage, said brake means comprising a brake disc rotative with said shaft, said brake engaging lever having a bifurcated end straddling said shaft and disposed to exert a thrust on said rotational brake disc for effecting braking.

References Cited in the file of this patent

UNITED STATES PATENTS

| | | |
|---|---|---|
| 2,159,326 | Harwood et al. | May 23, 1939 |
| 2,579,791 | Carter | Dec. 25, 1951 |
| 2,838,150 | Eason | June 10, 1958 |